Patented May 8, 1934

1,958,371

UNITED STATES PATENT OFFICE 1,958,371

PROCESSES FOR MAKING N-CHLORO AZO-DICARBONAMIDINES

Franz C. Schmelkes, Bloomfield, N. J., assignor to Wallace & Tiernan Products, Inc., Belleville, N. J., a corporation of New Jersey No Drawing. Application September 8, 1932
Serial No. 632,193

8 Claims. (Cl. 260—86)

This invention has for its object the production of a new and useful series of compounds which may be generically termed N-chloro azo-dicarbonamidines.

The processes hereinafter referred to yield very definite characteristic products, and, from the formulæ of the materials from which said products are made, the chemical analyses of said products, and their chemical properties, the generic graphic formula of such products appears to be that given below:

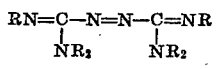

In this formula one or more R's represents a chlorine atom. The other R's represent hydrogen.

Of the group of compounds represented by the above graphic formula, the present invention is most particularly concerned with the production of N-dichloro-azo-dicarbonamidine.

The above mentioned compound forms needle-like yellow crystals. This compound colors water in which it is dissolved strongly yellow, even though the actual amount of the compound in a saturated water solution is not more than 200 parts in a million at 0° C. This color is still very marked at much lower concentrations.

This dichloro compound is soluble in alcohol, acetone, ether and benzol, but insoluble in carbon tetrachloride and chloroform.

On heating, it decomposes at around 150° C. without previously melting.

The property on which the usefulness of the above dichloro and other N-chloro derivatives of azo-dicarbonamidine largely depends is their ability to act as bactericides particularly in the presence of organic matter. Chlorine and other similar bactericides are very efficient in water substantially free from organic matter. Where, however, organic matter is present, the chlorine may all be consumed thereby before all bacteria present have been killed. N-chloro derivatives of azo-dicarbonamidine, on the other hand, are far less rapidly acted upon by organic matter, and, hence, remain substantially unchanged and capable of exerting bactericidal action long enough to kill all bacteria which may be present.

In addition to the above mentioned, these derivatives have the great advantage that they are among the most stable compounds containing bactericidal chlorine. Thus the chloramines, $NH_2Cl$ and $NHCl_2$ and nitrogen trichloride, cannot be made and shipped in pure form. They are not only gaseous or very volatile liquids, but also unstable, easily decomposed by heat, and liable to explode.

These new compounds are also highly advantageous in that they have no odor and almost no taste and do not react with substances normally contained in water to produce objectionable odors or tastes, as is so often the case with chlorine.

These N-chloro derivatives and their application to the sterilization of liquids, vessels, wounds, etc., form the subject matter of a co-pending application, Serial No. 684,121, filed August 7, 1933.

N - dichloro - azo - dicarbonamidine may be formed substantially quantitatively by the reaction in cold and conveniently but not necessarily neutral water solution between a hypochlorite and a salt, such as the hydrochloride, of either hydrazo-dicarbonamidine or azo-dicarbonamidine.

In recognition of the lack in chemical terminology of a term generically descriptive of both hydrazo- and azo-dicarbonamidines, the expression "bis-carbamidine" will hereinafter be used in the specification, to include both the hydrazo and azo compounds. This expression is adopted in view of the fact that the structure of both these types of compounds represents a condensation product of two carbamidine molecules.

"Bis-carbamidine" salts are used chiefly for convenience, as the salts of "bis-carbamidines" are more stable and more readily prepared and handled than the straight "bis-carbamidines."

The simplest hydrazo-dicarbonamidine has the empirical formula $C_2N_6H_8$ and the graphic formula:

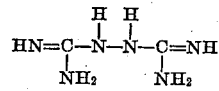

The corresponding hydrazo salt has the empirical formula $C_2N_6H_8.2HR$, or $C_2N_6H_8.H_2R$, etc., where R is an acid radical, such as $-Cl$, $-NO_3$, $-SO_4$, etc.

The reaction between a hydrazo salt and a hypochlorite, such as the hydrazo hydrochloride and sodium hypochlorite, may be represented by the following typical equation:

Chlorine water contains hypochlorous acid, so that, if chlorine water is used in place of sodium hypochlorite, the following equation obtains:

The simplest azo-dicarbonamidine has the empirical formula $C_2N_6H_6$ and the graphic formula:

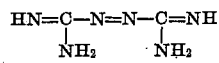

The corresponding azo salt has the empirical formula $C_2N_6H_6.2HR$ or $C_2N_6H_6.H_2R$, etc., where R is an acid radical, such as $-Cl$, $-NO_3$, $-SO_4$, etc.

The reactions between sodium hypochlorite and hypochlorous acid, respectively, and the azo hydrochloride may be represented by the following equations:

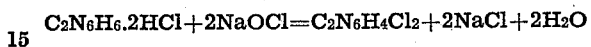

Further, it is not necessary to use the hypochlorite of sodium, as the corresponding salts of other metals, such as calcium, may also be employed.

Also, in place of the hydrochlorides, the "bis-carbamidine" salts of other acids, such as nitric or sulphuric acid, may be used, or the free bases may be used instead of the salts.

While hydrazo-dicarbonamidine contains 8 hydrogens and the corresponding azo compound 6 hydrogens, the reaction of the salts of such "bis-carbamidine" compounds with hypochlorite always results in a product containing only two chlorines. If the amount of hypochlorite required by the above equations is cut in half, then, instead of converting all of the salt into a product in which one hydrogen is replaced by chlorine, one-half of the salt is turned into the di-chloro compound, leaving the other half of the salt unchanged.

It is possible to form a tri-chloro compound by treating the di-chloro compound with an excess of a solution of chlorine gas when the tri-chloro compound is precipitated as an amorphous orange colored substance. The tri-chloro compound is considerably less stable than the di-chloro- and to that extent less desirable.

The reaction between the "bis-carbamidine" salt and hypochlorite or similar reagent are most conveniently brought about when the reacting materials are in water solution. Hydrazo-dicarbonamidine hydrochloride is very soluble in water, so that a 10 to 20% solution thereof may be used. Sodium hypochlorite is also readily soluble. On the other hand, the final N-dichloro product is only soluble to the extent of 200 parts per million of water, so that, using strong solutions of the hydrazo salt and hypochlorite, practically all of the N-dichloro product is precipitated and can be readily separated from the sodium chloride formed at the same time, and any residue of the initial reacting materials by filtering and washing the precipitated dichloro compound.

Azo-dicarbonamidine hydrochloride is not readily soluble and hence is mixed with the hypochlorite solution in the form of an aqueous suspension. The small part of the azo salt in solution reacts with the hypochlorite, and then more of the azo salt dissolves, until finally the only undissolved material left is the desired di-chloro product.

The temperature of the solutions employed should be low, preferably below 5° C., or otherwise the yield will be injuriously affected.

What is claimed is:

1. The process of preparing an N-chloro azo-dicarbonamidine, comprising reacting a compound selected from the group consisting of hydrazo-dicarbonamidine and azo-dicarbonamidine with a compound having the acid radical of hypochlorous acid.

2. The process of preparing an N-chloro azo-dicarbonamidine, comprising reacting a salt of a compound selected from the group consisting of hydrazo-dicarbonamidine and azo-dicarbonamidine with a hypochlorite.

3. The process as in claim 2, in which the reaction takes place in the cold.

4. The process as in claim 2, in which the reaction takes place in the presence of water and at a temperature not greatly in excess of 5° C.

5. The process as in claim 2, in which the reaction takes place in substantially neutral water solution.

6. The process of preparing an N-chloro azo-dicarbonamidine, comprising reacting a salt of a hydrazo-dicarbonamidine with a hypochlorite.

7. The process of preparing an N-chloro azo-dicarbonamidine, comprising reacting a salt of an azo-dicarbonamidine with a hypochlorite.

8. The process of preparing an N-chloro azo-dicarbonamidine, comprising reacting a salt of an azo-dicarbonamidine with hypochlorous acid.

FRANZ C. SCHMELKES.